(12) United States Patent
Homma et al.

(10) Patent No.: US 10,495,209 B2
(45) Date of Patent: Dec. 3, 2019

(54) ACTUATOR

(71) Applicant: THK CO., LTD., Tokyo (JP)

(72) Inventors: Kazuto Homma, Tokyo (JP); Kenichi Hasebe, Tokyo (JP); Toshihisa Maeda, Tokyo (JP); Junichi Sakai, Tokyo (JP); Nobuyuki Maki, Tokyo (JP); Kaoru Hoshide, Tokyo (JP)

(73) Assignee: THK CO., LTD., Tokyo (JP)

( * ) Notice: Subject to any disclaimer, the term of this patent is extended or adjusted under 35 U.S.C. 154(b) by 131 days.

(21) Appl. No.: 15/762,178

(22) PCT Filed: Sep. 9, 2016

(86) PCT No.: PCT/JP2016/076589
§ 371 (c)(1),
(2) Date: Mar. 22, 2018

(87) PCT Pub. No.: WO2017/061232
PCT Pub. Date: Apr. 13, 2017

(65) Prior Publication Data
US 2018/0291999 A1 Oct. 11, 2018

(30) Foreign Application Priority Data
Oct. 7, 2015 (JP) ................................. 2015-199637

(51) Int. Cl.
*F16H 57/04* (2010.01)
*F16H 25/22* (2006.01)

(52) U.S. Cl.
CPC ..... *F16H 57/0497* (2013.01); *F16H 25/2204* (2013.01)

(58) Field of Classification Search
CPC ... F16H 57/04; F16H 57/0497; F16H 25/2204
See application file for complete search history.

(56) References Cited

U.S. PATENT DOCUMENTS 5,299,465 A * 4/1994 Kasuga ................. F16C 29/063
384/45
5,454,278 A * 10/1995 Kasuga .................... B23Q 1/58
184/5

(Continued)

FOREIGN PATENT DOCUMENTS

JP  6-43408 U    6/1994
JP  9-317839 A  12/1997

(Continued)

OTHER PUBLICATIONS

International Search Report dated Nov. 8, 2016, issued in Counterpart of International Application No. PCT/JP2016/076589 (2 pages).

(Continued)

*Primary Examiner* — David M Fenstermacher
(74) *Attorney, Agent, or Firm* — Westerman, Hattori, Daniels & Adrian, LLP

(57) ABSTRACT

An actuator includes a track member provided with a base extending along a longitudinal direction and a pair of walls erected from opposite ends of the base in a width direction, with rolling-element rolling grooves formed along the longitudinal direction; and a moving member assembled movably along the longitudinal direction between the walls, with respective load rolling-element rolling grooves corresponding to the rolling-element rolling grooves being formed in the moving members; and a screw shaft passed through a through-hole formed in the moving member, with a screw rolling-element rolling groove formed in the screw shaft, the screw rolling-element rolling groove being spiral in shape, wherein the moving member has the nut member attached to the through-hole, with the screw load rolling-element rolling groove corresponding to the screw rolling-element rolling groove formed in the nut, the nut member is assembled via a flange member which includes a lubricant supply device.

6 Claims, 5 Drawing Sheets

(56) References Cited

U.S. PATENT DOCUMENTS

| | | | | |
|---|---|---|---|---|
| 5,598,043 | A | * | 1/1997 | Hirano .................. F16C 29/082 310/12.04 |
| 6,155,717 | A | * | 12/2000 | Michioka ............ F16C 29/0642 384/15 |
| 6,191,548 | B1 | * | 2/2001 | Kajita ...................... B23Q 1/58 318/568.18 |
| 7,488,110 | B2 | * | 2/2009 | Lee ..................... F16C 29/0609 384/15 |
| 2003/0000322 | A1 | * | 1/2003 | Nagai ................. F16H 25/2204 74/89.36 |
| 2005/0257633 | A1 | * | 11/2005 | Yamagishi .............. F16H 25/20 74/89.33 |
| 2010/0101343 | A1 | * | 4/2010 | Shirai ..................... B23Q 5/36 74/89.34 |
| 2010/0206103 | A1 | * | 8/2010 | Duits ...................... F16H 25/20 74/89.34 |
| 2015/0330497 | A1 | * | 11/2015 | Amano .................... H02K 7/06 74/89.41 |
| 2015/0377330 | A1 | * | 12/2015 | Mori ................... F16H 25/2214 74/89.44 |

FOREIGN PATENT DOCUMENTS

| | | |
|---|---|---|
| JP | 2001-41305 A | 2/2001 |
| JP | 2012-180891 A | 9/2012 |
| JP | 2013-100865 A | 5/2013 |
| JP | 2013-145037 A | 7/2013 |

OTHER PUBLICATIONS

Decision to Grant a Patent dated Jan. 25, 2017, issued in counterpart of Japanese Patent Application No. PCT/JP2016/076589 with English Translation (3 pages).

* cited by examiner

ACTUATOR

TECHNICAL FIELD

The present invention relates to an actuator, and more particularly, to an actuator which can reduce overall weight without greatly reducing basic performance and can supply grease to both a rectilinear guide unit and nut member at the same time using a simple and easy structure.

BACKGROUND ART

Conventionally, an actuator is known which includes a track member provided with a base extending along a longitudinal direction and a pair of walls erected from opposite ends of the base in a width direction, with a rolling-element rolling groove formed along the longitudinal direction; a moving member assembled movably along the longitudinal direction between the walls, with a load rolling-element rolling groove corresponding to the rolling-element rolling groove formed in the moving member; and a screw shaft passed through a through-hole formed in the moving member, with a screw rolling-element rolling groove formed in the screw shaft, the screw rolling-element rolling groove being spiral in shape.

In such an actuator, rolling elements are interposed, respectively, between the track member and the moving member and between the screw shaft and a nut member attached to the moving member, forming a greasing structure for smooth rolling of the rolling elements.

Various types of such greasing structures are known, including a structure described, for example, in Patent Literature 1, in which a first passage leading to a thread groove of a nut member is formed to pass a lubricant injected through an inlet for use to supply the lubricant to a moving member; and the first passage includes a second passage continuous with the inlet formed in the moving member, a third passage formed in the nut member, a fourth passage formed between the moving member and the nut member, and a fifth passage adapted to supply the lubricant to a rolling element between a track member and the moving member by being communicated with the fourth passage.

Structures such as described above allow the lubricant supplied through the inlet to be supplied directly to the rolling element between the track member and moving member as well as the rolling element between the screw shaft and nut member, making it possible to supply the lubricant stably.

CITATION LIST

Patent Literature

Patent Literature 1: Japanese Patent Laid-Open No. 2013-145037

DISCLOSURE OF THE INVENTION

Problems to be Solved by the Invention

However, to form plural passages in the moving member and nut member as described in Patent Literature 1, complicated processes are needed for machining of the moving member and nut member, posing a problem in that the machining takes time and labor, making it difficult to curb production costs.

Besides, a structure is also known in which greasing mechanisms are provided to supply a lubricant to a rolling element between a track member and moving member and to a rolling element between a screw shaft and nut member, respectively, but the structure poses a problem in that separate greasing mechanisms are needed, complicating lubricant supply work.

The present invention has been made to solve the above problems and has an object to provide an actuator which can easily supply a lubricant to each of a rolling element between a track member and moving member and a rolling element between a screw shaft and nut member, and can be produced inexpensively by curbing production costs.

Means for Solving the Problems

The present invention provides an actuator comprising: a track member provided with a base extending along a longitudinal direction and a pair of walls erected from opposite ends of the base in a width direction, with a rolling-element rolling groove formed along the longitudinal direction; a moving member assembled movably along the longitudinal direction between the walls, with a load rolling-element rolling groove corresponding to the rolling-element rolling groove formed in the moving member; and a screw shaft passed through a through-hole formed in the moving member, with a screw rolling-element rolling groove formed in the screw shaft, the screw rolling-element rolling groove being spiral in shape, wherein the moving member has a nut member attached to the through-hole, with a screw load rolling-element rolling groove corresponding to the screw rolling-element rolling groove formed in the nut, the nut member is assembled via a flange member assembled onto one end of the moving member in the longitudinal direction, and the flange member includes a lubricant supply device adapted to supply a lubricant to between the rolling-element rolling groove and the load rolling-element rolling groove and to the screw rolling-element rolling groove.

Effect of the Invention

Since the flange member includes the lubricant supply device adapted to supply a lubricant to between the rolling-element rolling groove and the load rolling-element rolling groove and to the screw rolling-element rolling groove, the present invention can easily supply the lubricant to each site and produce the actuator inexpensively by curbing the number of parts without complex machining.

MODE FOR CARRYING OUT THE INVENTION

An embodiment of an actuator according to the present invention will be described below with reference to the drawings. Note that the embodiment described below is not intended to limit the claimed invention and that a combination of all the features described in the embodiment is not necessarily essential for the solution of the present invention.

Figure 1:
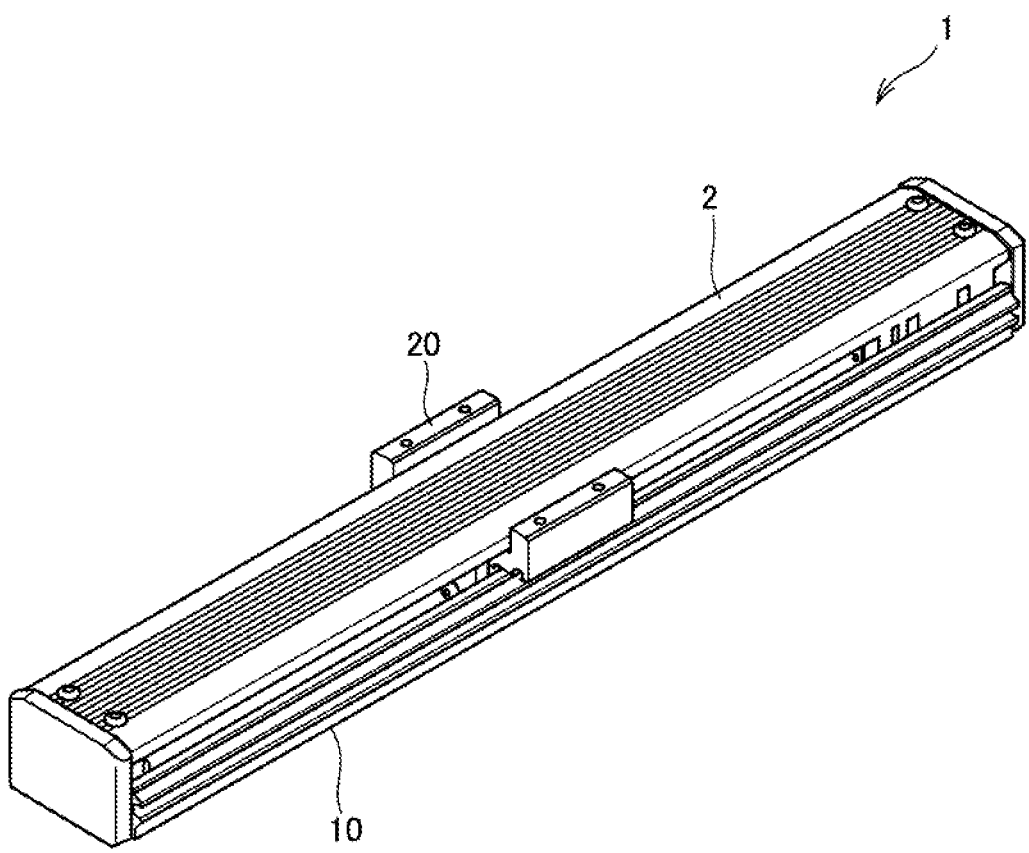
FIG. 1 is a perspective view of an actuator according to an embodiment of the present invention.
Figure 2:
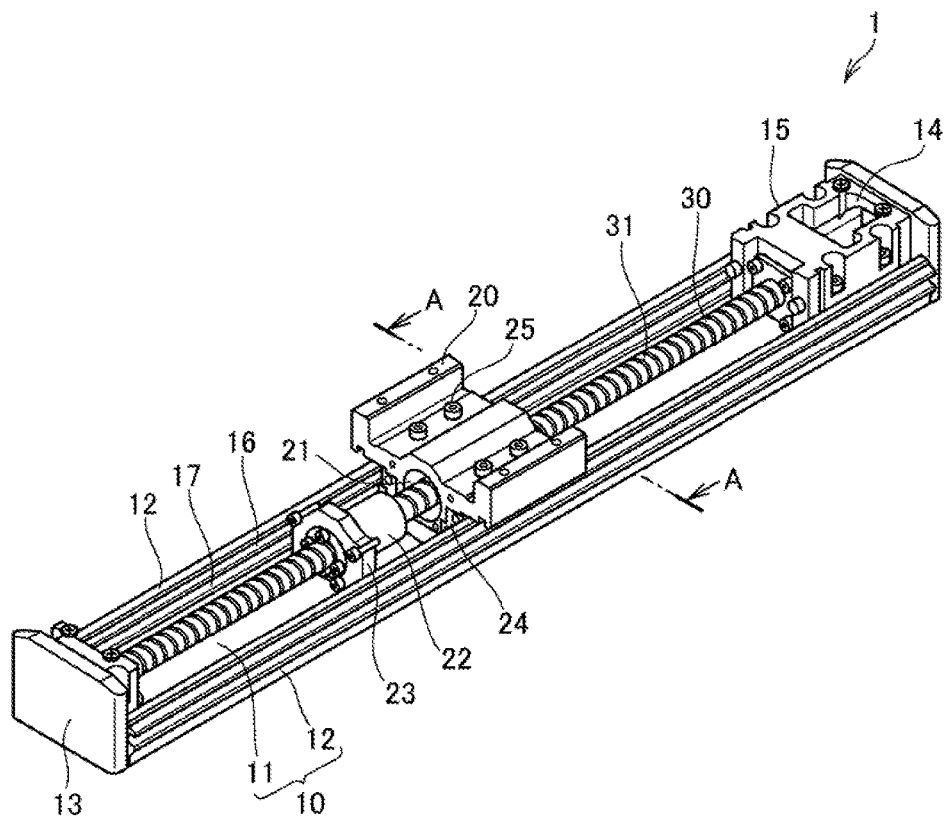
FIG. 2 is an exploded view of the actuator according to the embodiment of the present invention.
Figure 3:
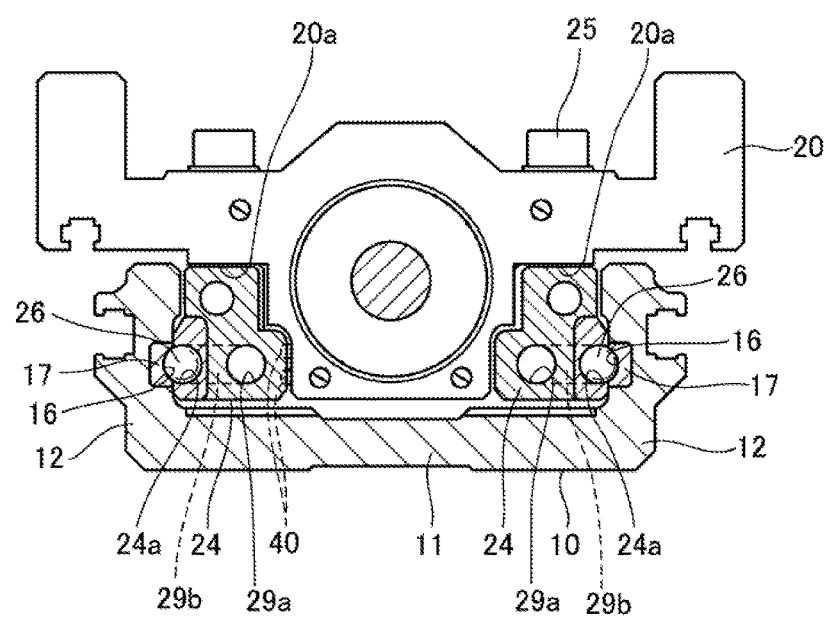
FIG. 3 is a sectional view taken along line A-A in FIG. 2.
Figure 4:
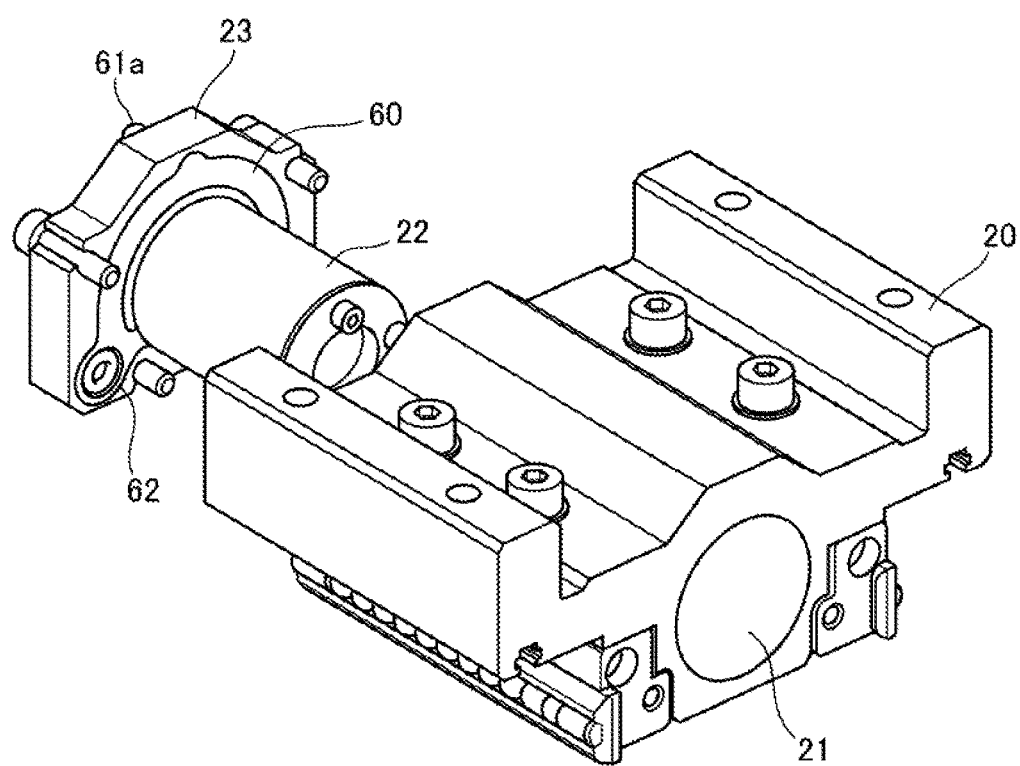
FIG. 4 is an exploded view for explaining a configuration of a moving member used for the actuator according to the embodiment of the present invention.
Figure 5:
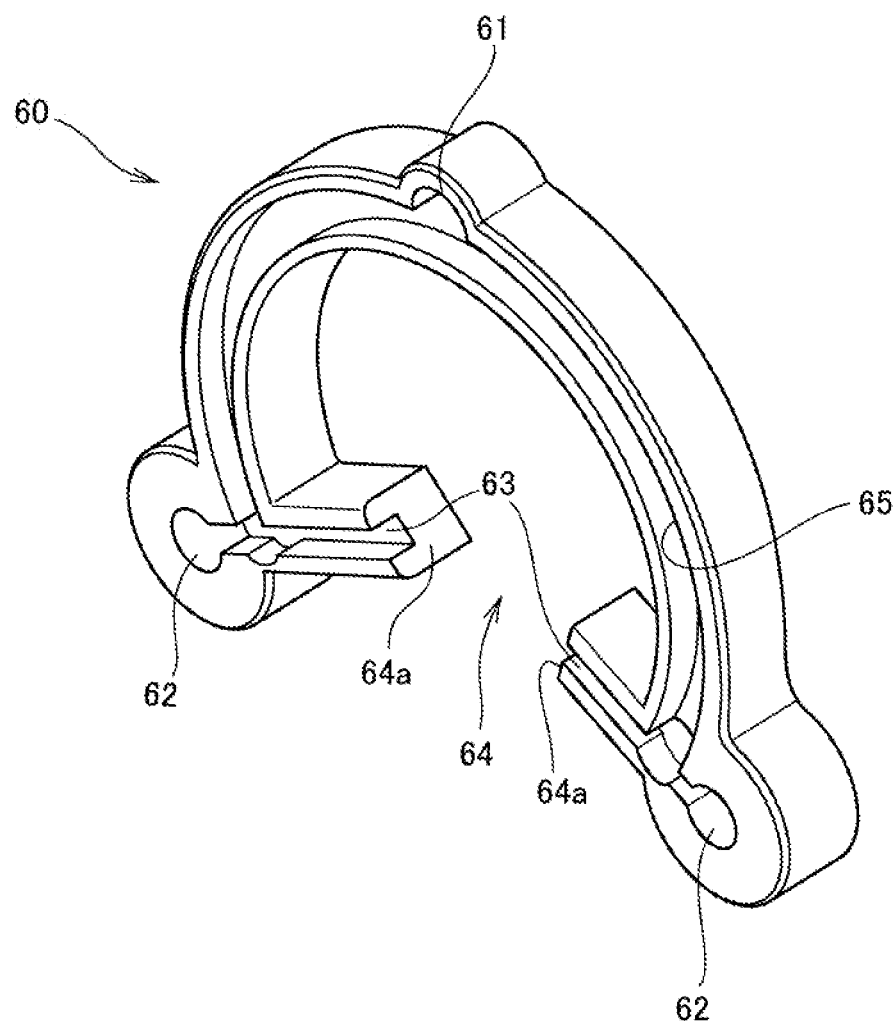
FIG. 5 is a perspective view for explaining a configuration of a lubricant supply device used for the actuator according to the embodiment of the present invention.
Figure 6:
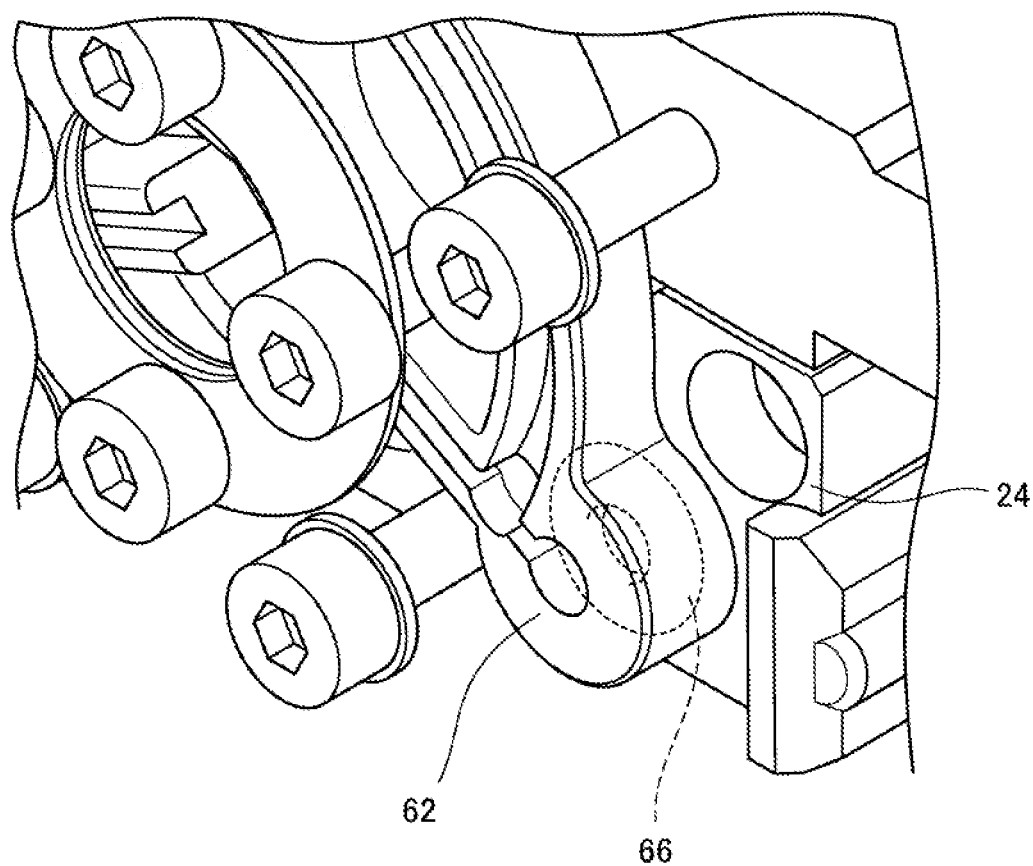
FIG. 6 is a partially enlarged view for explaining a configuration of a lubricant supply device used for the actuator according to the embodiment of the present invention.

FIG. 1 is a perspective view of an actuator according to an embodiment of the present invention, FIG. 2 is an exploded view of the actuator according to the embodiment of the present invention, FIG. 3 is a sectional view taken along line A-A in FIG. 2, FIG. 4 is an exploded view for explaining a configuration of a moving member used for the actuator according to the embodiment of the present invention, FIG. 5 is a perspective view for explaining a configuration of a lubricant supply device used for the actuator according to the embodiment of the present invention, and FIG. 6 is a partially enlarged view for explaining a configuration of a lubricant supply device used for the actuator according to the embodiment of the present invention.

As shown in FIG. 1, the actuator 1 according to the present embodiment includes a track member 10 extending along a longitudinal direction, and a moving member 20 assembled movably in the longitudinal direction along the track member 10. Also, a cover 2 is attached to an upper face of the track member 10 to prevent foreign matter from getting inside the actuator 1. Note that the moving member 20 extends outside through a gap formed between the track member 10 and cover 2 and is attached to an object to be guided.

As shown in FIG. 2, the track member 10 includes a base 11 extending along the longitudinal direction and a pair of walls 12 erected from opposite ends of the base 11 in a width direction. Rolling groove components 17 are attached, respectively, to opposing faces of the walls 12 along the longitudinal direction. Rolling-element rolling grooves 16 are formed in the rolling groove components 17, running along the longitudinal direction.

Also, the track member 10 has a drive member 14 attached and a drive member mount portion 15 formed at one end in the longitudinal direction, where the drive member mount portion 15 rotatably supports a screw shaft 30 imparted with a turning force by the drive member 14. An end wall 13 adapted to rotatably support the screw shaft 30 described later is formed at another end in the longitudinal direction. Note that preferably an electric motor or the like is used as the drive member 14. Note that the rolling groove components 17 are made of hard metal such as steel and preferably the track member 10 is made of a material, such as an aluminum alloy, lighter than steel.

The moving member 20 is assembled movably along the longitudinal direction between the walls 12 formed on the track member 10. A through-hole 21 is formed in the moving member 20 to allow passage of the screw shaft 30 rotatably assembled on the track member 10, and a nut member 22 to be screwed onto the screw shaft 30 is assembled onto the through-hole 21 via a flange member 23.

Also, as shown in FIG. 3, the moving member 20 includes guide members 24 assembled such that rolling elements 26 rolling along the rolling-element rolling grooves 16 formed in the rolling groove components 17 assembled on the track member 10 will circulate endlessly. A pair of the guide members 24 contoured to fit the walls 12 are mounted in a width direction of the moving member 20 by being fixed to mounting surfaces 20a formed on the moving member 20.

Furthermore, one of the guide members 24 is attached to the moving member 20 via a biasing member 40. Note that each of the guide members 24 include a load rolling-element rolling groove 24a opposed to the rolling-element rolling groove 16, a rolling-element return passage 29a formed as a through-hole in parallel to the load rolling-element rolling groove 24a, and a direction change path 29b configured to couple together a rolling-element rolling path and rolling-element return path 29a, the rolling-element rolling path being made up of the rolling-element rolling groove 16 and load rolling-element rolling groove 24a, and that when the rolling element 26 is rolling along the rolling-element rolling path by applying a load to the rolling-element rolling path, upon reaching one end of the rolling-element rolling path, the rolling element 26 is passed through the rolling-element return path 29a via the direction change path 29b, and is thereby returned to another end. In this way, the guide members 24 realize endless circulation of the rolling elements 26.

Preferably, the biasing member 40 is made of an elastic body such as a rubber tube, and more preferably, a hollow rubber tube. The biasing member 40 biases the guide member 24 toward the wall 12 by elastic force. The biasing force has been adjusted such that an appropriately gap will be provided between the rolling-element rolling groove 16 and load rolling-element rolling groove 24a according to a diameter of the rolling element 26 rolling between the grooves, and thus the gap can be adjusted easily.

The guide member 24 is fixed by a fastening device 25 such as a bolt from a direction (e.g., an upper face of the moving member 20) intersecting a biasing direction of the biasing member 40 of the moving member 20. In this way, since the guide member 24 is fixed to the moving member 20 by the fastening device 25 from the direction intersecting the biasing direction of the biasing member 40, the guide member 24 can be fixed by being positioned by the above-mentioned biasing member 40 without a fastening force of the fastening device 25 affecting the biasing force of the biasing member 40. Note that the guide members 24 are made of hard metal such as steel and preferably the moving member 20 is made of a material, such as an aluminum alloy, lighter than steel.

As shown in FIG. 4, the nut member 22 is inserted in the through-hole 21 formed in the moving member 20, and the flange member 23 attached to one end of the nut member 22 is fastened and fixed to one end of the moving member 20.

A lubricant supply device 60 is attached to that surface of the flange member 23 which is opposed to the moving member 20. Regarding the lubricant supply device 60, a replenishing port 61a is provided on a back face of the flange member 23, protruding outward, and the lubricant can be supplied into the lubricant supply device 60 through the replenishing port 61a.

As shown in FIG. 5, the lubricant supply device 60 is placed substantially concentrically with an outer circumference of the nut member 22, being formed into an annular shape having an opening 64. Note that a pair of first supply ports 62 and a pair of second supply ports 63 are formed in end portions 64a which face each other forming the opening 64 of the lubricant supply device 60, where the first supply ports 62 are used to supply the lubricant to between the rolling-element rolling groove 16 and load rolling-element rolling groove 24a and the second supply ports 63 are used to supply the lubricant to a screw rolling-element rolling groove 31 formed in the screw shaft 30. Furthermore, the first supply ports 62 and second supply ports 63 are placed axisymmetrically to each other with respect to a symmetry axis L extending in a radial direction of the lubricant supply device 60, and a lubricant introduction portion 61 adapted to replenish the lubricant is formed on the symmetry axis L.

Note that the lubricant introduction portion 61, first supply port 62, and second supply port 63 are connected with one another through a supply passage 65. A distance from the lubricant introduction portion 61 to the first supply port 62 and a distance from the lubricant introduction portion 61 to the second supply port 63 are set substantially equal to each other, making it possible to supply the lubricant equally to between the rolling-element rolling groove 16 and load rolling-element rolling groove 24a and to the screw rolling-element rolling groove 31.

As shown in FIG. 6, each of the first supply ports 62 supplies the lubricant to the rolling element 26 rolling between the rolling-element rolling groove 16 and load rolling-element rolling groove 24a, through a supply hole (not shown) formed in the guide member 24 via a sealing member 66.

Also, the second supply ports 63 supply the lubricant to the screw rolling-element rolling groove 31 formed in the screw shaft 30 by being connected directly to the screw rolling-element rolling groove 31.

As shown in FIG. 2, the screw shaft 30 and nut 22 make up a ball screw device. In the ball screw device, the screw shaft 30 is formed by extending along an axial direction, with the spiral, screw rolling-element rolling groove being formed at a predetermined lead on an outer circumferential surface; the nut 22 is formed into a cylindrical shape by being provided with a through-hole through which the screw shaft 30 is passed, with a screw load rolling-element rolling groove being formed in an inner circumferential surface of the through-hole, facing the screw rolling-element rolling groove 31 formed in the screw shaft 30; and the screw shaft 30 and nut 22 are screwed together, with plural ball-screw rolling-element being arranged between the screw rolling-element rolling groove 31 and screw load rolling-element rolling groove. Note that the nut 22 is not limited to a cylindrical shape, and may be formed, for example, into a tubular shape rectangular or the like in cross section orthogonal to the axial direction.

The ball screw device with the above configuration is configured such that the nut 22 will perform motion along the axial direction of the screw shaft 30 due to relative rotation of the screw shaft 30 and nut 22. In the motion guide apparatus 1 according to the present embodiment, rotational movement of the screw shaft 30 rotated by rotation of the drive member 14 is converted into translatory movement of the nut 22. Note that the screw shaft 30 and nut 22 are made of hard metal such as steel and preferably the flange member 23 is made of a material, such as an aluminum alloy, lighter than steel.

In this way, since the nut member 22 is assembled via the flange member 23 assembled onto one end of the moving member 20 in the longitudinal direction and the flange member 23 includes the lubricant supply device 60 adapted to supply the lubricant to between the rolling-element rolling grooves 16 and load rolling-element rolling grooves 24a and to between the screw rolling-element rolling groove 31 and screw load rolling-element rolling groove 32, the actuator 1 according to the present embodiment can supply the lubricant easily to rolling elements in a so-called linear motion unit between the track member and moving member and to rolling elements between the screw shaft and nut member using a simple and easy structure and can be produced inexpensively by curbing production costs without requiring complex machining.

Also, since the lubricant supply device 60 is placed substantially concentrically with the outer circumference of the nut member 22, being formed into an annular shape having an opening 64, the actuator 1 according to the present embodiment can form the lubricant supply device 60 with a simple and easy configuration.

Also, in the actuator 1 according to the present embodiment, the first supply ports 62 used to supply the lubricant to between the rolling-element rolling grooves 16 and load rolling-element rolling grooves 24a and the second supply ports 63 used to supply the lubricant to the screw rolling-element rolling groove 31 are formed in the end portions 64a facing each other forming the opening 64, the first supply ports 62 and second supply ports 63 are placed axisymmetrically to each other with respect to the symmetry axis L extending in the radial direction of the lubricant supply device 60, and the lubricant introduction portion 61 is formed on the symmetry axis L. Consequently, the distance from the lubricant introduction portion 61 to the first supply ports 62 and the distance from the lubricant introduction portion 61 to the second supply ports 63 can be set substantially equal to each other, making it possible to supply the lubricant equally to between the rolling-element rolling grooves 16 and load rolling-element rolling grooves 24a and to the screw rolling-element rolling groove 31.

Also, in the actuator 1 according to the present embodiment, the rolling groove components 17 in which the rolling-element rolling grooves 16 are formed are attached to the walls 12, at least the rolling groove components 17, guide members 24, and screw shaft 30 are formed of steel, and the track member 10 and moving member 20 are formed of a material lighter than steel. Consequently, a rated load can be secured and weight reduction can be achieved at the same time.

Note that the present invention is not limited to the above embodiment and that various changes can be made without changing the spirit and scope of the present invention. For example, the lubricant supply device 60 may be formed of any material, but if formed of an elastic material such as rubber, the lubricant supply device 60 can prevent the lubricant passing through the supply passage 65 from leaking from the flange member 23. It will be apparent from the description of the appended claims that any form resulting from such changes or improvements is also included in the technical scope of the present invention.

REFERENCE NUMERALS 1 actuator, 10 track member, 11 base, 12 wall, 16 rolling-element rolling groove, 17 rolling groove component, 20 moving member, 24 guide member, 24a load rolling-element rolling groove, 25 fastening device, 30 screw shaft, 31 screw rolling-element rolling groove, 60 lubricant supply device, 61 lubricant introduction portion, 62 first supply port, 63 second supply port, 64 opening

The invention claimed is:

1. An actuator comprising:
   a track member provided with a base extending along a longitudinal direction and a pair of walls erected from opposite ends of the base in a width direction, with a rolling-element rolling groove formed along the longitudinal direction;
   a moving member assembled movably along the longitudinal direction between the walls, with a load rolling-element rolling groove corresponding to the rolling-element rolling groove formed in the moving member; and a screw shaft passed through a through-hole formed in the moving member, with a screw rolling-element rolling groove formed in the screw shaft, the screw rolling-element rolling groove being spiral in shape, wherein the moving member has a nut member attached to the through-hole, with a screw load rolling-element rolling groove corresponding to the screw rolling-element rolling groove formed in the nut, a flange member is assembled onto the nut member, and the flange member is assembled onto one end of the moving member in the longitudinal direction and provided with a lubricant supply device adapted to supply a lubricant to between the rolling-element rolling groove and the load rolling-element rolling groove and to the screw rolling-element rolling groove.

2. The actuator according to claim 1, wherein the lubricant supply device is placed substantially concentrically with an outer circumference of the nut member, being formed into an annular shape having an opening.

3. The actuator according to claim 2, wherein:

in the lubricant supply device, a pair of first supply ports used to supply the lubricant to between the rolling-element rolling groove and the load rolling-element rolling groove and a pair of second supply ports used to supply the lubricant to the screw rolling-element rolling groove are formed in end portions which face each other forming the opening; and the first supply ports and the second supply ports are placed axisymmetrically to each other with respect to a symmetry axis extending in a radial direction of the lubricant supply device, and a lubricant introduction portion adapted to replenish the lubricant is formed on the symmetry axis.

4. The actuator according to claim 1, wherein:

a guide member with the load rolling-element rolling groove formed therein is attached to the moving member;

a rolling groove component with the rolling-element rolling groove formed therein is attached to the walls; and at least the guide member, the rolling groove component, the screw shaft, and the nut member are formed of steel and at least the track member, the moving member, and the flange member are formed of a material lighter than the steel.

5. The actuator according to claim 2, wherein:

a guide member with the load rolling-element rolling groove formed therein is attached to the moving member;

a rolling groove component with the rolling-element rolling groove formed therein is attached to the walls; and at least the guide member, the rolling groove component, the screw shaft, and the nut member are formed of steel and at least the track member, the moving member, and the flange member are formed of a material lighter than the steel.

6. The actuator according to claim 3, wherein:

a guide member with the load rolling-element rolling groove formed therein is attached to the moving member;

a rolling groove component with the rolling-element rolling groove formed therein is attached to the walls; and at least the guide member, the rolling groove component, the screw shaft, and the nut member are formed of steel and at least the track member, the moving member, and the flange member are formed of a material lighter than the steel.

* * * * *